United States Patent [19]
Pons et al.

[11] Patent Number: 5,304,777
[45] Date of Patent: Apr. 19, 1994

[54] METHOD OF CONNECTING A MANGANESE STEEL PART TO ANOTHER CARBON STEEL PART AND ASSEMBLY THUS OBTAINED

[75] Inventors: Fernand Pons, Alisay; André M. J. Spolidor, Pont-de-l'Arche; Daniel L. Seillier, Saint-Martin-les-Boulogne, all of France

[73] Assignee: Manoir Industries, France

[21] Appl. No.: 874,171

[22] Filed: Apr. 24, 1992

[30] Foreign Application Priority Data

Apr. 24, 1991 [FR] France ................................. 91 05067

[51] Int. Cl.$^5$ .................................................. B23K 9/23
[52] U.S. Cl. ............................. 219/137 WM; 219/54; 219/121.14; 219/121.64
[58] Field of Search ............ 219/137 R, 137 WM, 54, 219/121.64, 121.14

[56] References Cited

U.S. PATENT DOCUMENTS 2,060,765  11/1936  Welch .............................. 219/137 R

FOREIGN PATENT DOCUMENTS 2353360  12/1977  France .
2471831   6/1981  France .

*Primary Examiner*—Clifford C. Shaw
*Attorney, Agent, or Firm*—Steinberg, Raskin & Davidson

[57] ABSTRACT

A method of connecting a manganese steel part to another carbon steel part including the steps of depositing an austeno-ferritic stainless steel at the end of a carbon steel part and welding the latter provided at its end with the deposit to a manganese steel part, the method being applicable to assembling a rail to a common crossing railway track part.

16 Claims, 2 Drawing Sheets

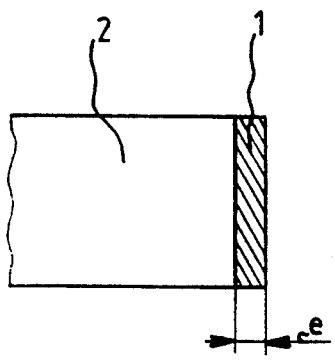
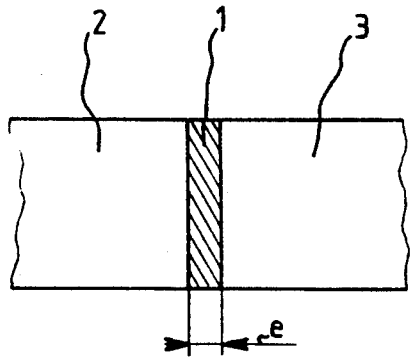
Fig. 1    Fig. 2
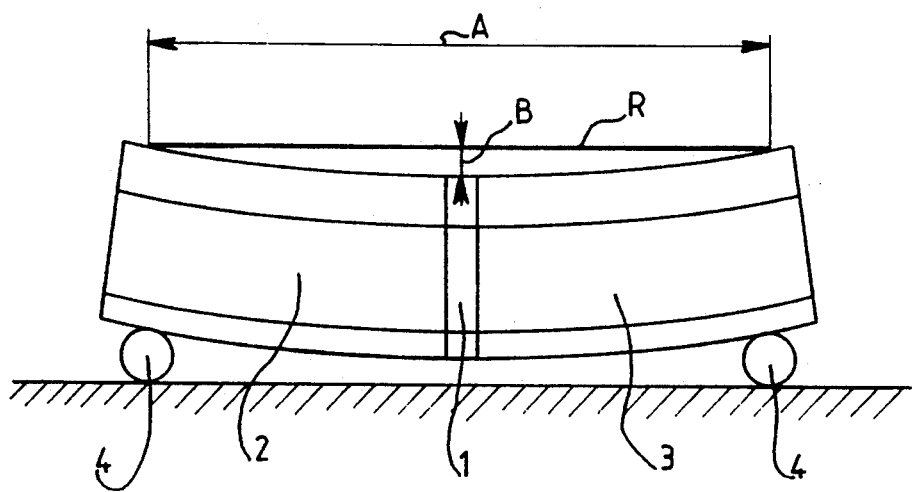
Fig. 4

METHOD OF CONNECTING A MANGANESE STEEL PART TO ANOTHER CARBON STEEL PART AND ASSEMBLY THUS OBTAINED

BACKGROUND OF THE INVENTION

The present invention relates generally to a method of connection of a manganese steel part to one or several carbon steel parts.

The invention is in particular applicable in the railway field for the connection of a manganese steel track part forming a common crossing to at least one carbon steel rail. These track parts are made from a steel containing 12–14% by weight of manganese.

It is known to connect a manganese steel part to another carbon steel part through the medium of an insert or of an intermediate element with the same cross-section as the parts to be assembled.

This insert is an austenitic or austeno-ferritic steel part and is obtained through molding or through casing.

Such a method however requires the use of a shaped insert the making and implementing of which are expensive.

Moreover the fact of welding the insert to a carbon steel part by a pocket or flash weld provides upon each weld a substantial bead or seam which has to be mechanically removed thereby leading to major stresses of metallurgical and economical character hence to a serious inconvenience.

Although resulting in consequences of less importance the same formation of a bead or seam is found when welding the insert to the manganese steel part still in the case of pocket or flash welding.

Moreover the parts thus connected may exhibit brittling phases in the transition zones of the welds thus made.

At last such a method of connection through the agency of a shaped insert involves relatively substantial manipulation time and power consumption.

OBJECTS AND SUMMARY OF THE INVENTION

The object of the invention is to cope with the aforesaid inconveniences of the prior art by providing a method of connecting a manganese steel part to at least another carbon steel part, which consists in:

depositing an austeno-ferritic stainless steel at the end of at least one carbon steel part; and welding the carbon steel part provided at its end with the deposit thus obtained to the manganese steel part.

This method consists more specifically in:

preheating prior to the aforesaid depositing step the carbon steel part up to about 300°–600° C.;

carrying out an austeno-ferritic stainless steel deposit onto the end of the carbon steel part by means of a wire such as through the NIG process or the TIG process or by means of electrodes;

subjecting to a controlled cooling the carbon steel part comprising at its end the deposit immediately after the provision of this deposit, and welding the carbon steel part with its end comprising the said deposit to the manganese steel part by any welding technique whatsoever.

It should be specified here that after the controlled cooling stage the carbon steel part having the deposit at its end is subjected to a treatment for surfacing this deposit, the said controlled cooling effected from about 600° C. down to the room temperature.

According to an advantageous characterizing feature of the invention the carbon steel part having the deposit at its end is welded to the manganese steel part by a welding technique such as by an electrode beam or a laser beam.

According to another advantageous characterizing feature of the invention the thickness of the deposit of austeno-ferritic stainless steel onto the carbon steel part lies between 1 and 20 millimeters.

According to still another characterizing feature of the invention the austeno-ferritic stainless steel which is deposited onto the carbon steel part has the following chemical composition:

| | |
|---|---|
| Carbon | 0.025–0.035% by weight |
| Manganese | 6–11% by weight |
| Silicon | 0.5–1.5% by weight |
| Nickel | 5–8% by weight |
| Chromium | 17.5–20% by weight |
| Molybdenum | <0.5% by weight |
| Niobium | 0.25–0.35% by weight |
| Nitrogen | residual up to 700 ppm |
| Phosphorus and Sulfur | ≦0.030% by weight | and the delta ferrite content of which measured by counting is lying between about 5 and 15% by volume.

BRIEF DESCRIPTION OF THE DRAWINGS

The invention will be better understood and further objects, characterizing features, details and advantages thereof will appear better when reading the explanatory description which follows with reference to the accompanying diagrammatic drawings given by way of non limiting examples only and illustrating presently preferred specific embodiments of the invention and wherein:

FIG. 1 diagrammatically shows a carbon steel rail section comprising a deposit upon one of its ends;

FIG. 2 diagrammatically shows a rail section provided with its deposit and connected to the end of a track part according to the method of the invention;

FIG. 4 is a side view illustrating an assembly carried out according to the method of the invention and having undergone a bending test.

DETAILED DESCRIPTION OF THE INVENTION

Figure 3:
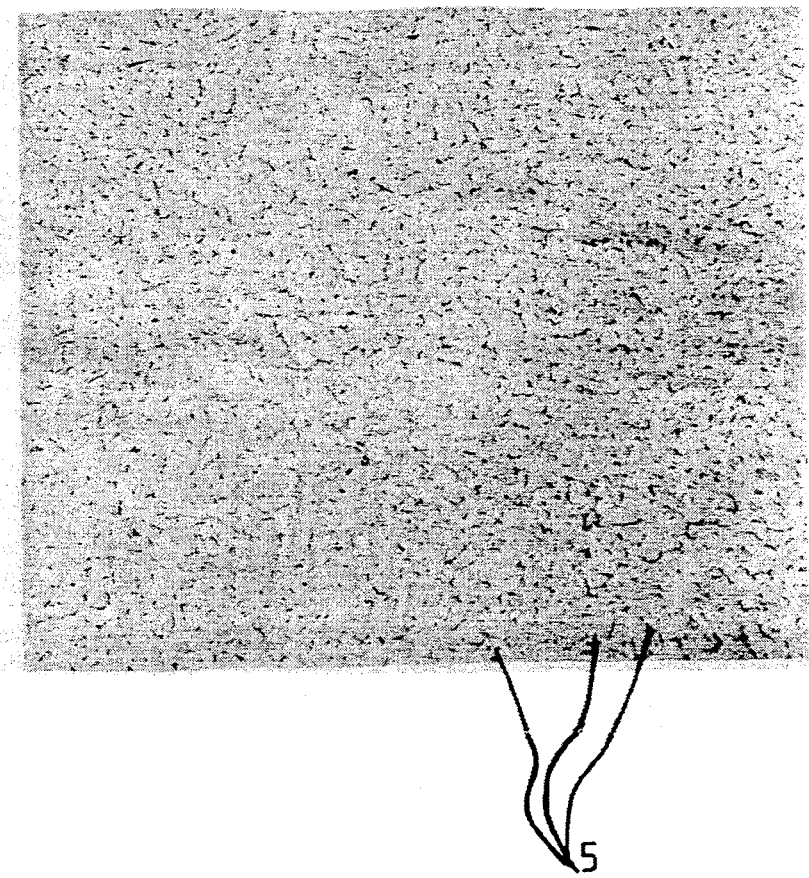
FIG. 3 is a micrography of an example of austeno-ferritic stainless steel deposit carried out according to the invention upon a carbon steel part such as a rail.

According to the method of this invention the carbon steel part which is a rail section 2 is at first preheated between 300°–600° C. in a furnace.

At the end of the carbon steel part is deposited an austeno-ferritic stainless steel 1. This deposit is effected by means of a wire through the MIG process or the TIG process in the manual or automatic fashion, the wire for providing the deposit having the composition given hereinafter. Instead of a wire could perfectly well be used electrodes the material of which as that of the wire would constitute the said deposit of austeno-ferritic steel.

The laying down of this deposit is preferably made with a relatively small thickness lying between about 1 mm and 20 mm and forms an advantageously very small and not very expensive supply of material in comparison with the substantial and expensive supply of material required by the provision of an insert as this has been the case in the prior art.

Moreover such a very thin deposit may be carried out automatically and much more quickly than in the prior insert welding techniques.

Furthermore no weld bead is appearing after the deposition onto the carbon steel part contrary to what occurs at the end of a pocket welding or a flash welding. The conditions for providing this deposit and of its heat treatment advantageously avoid any formation of a brittling phase.

The composition of the austeno-ferritic stainless steel initially in the shape of a wire, an electrode or the like which is deposited is the following:

| Carbon | 0.025–0.035% by weight |
|---|---|
| Manganese | 6–11% by weight |
| Silicon | 0.5–1.5% by weight |
| Nickel | 5–8% by weight |
| Chromium | 17.5–20% by weight |
| Molybdenum | <0.5% by weight |
| Niobium | 0.25–0.35% by weight |
| Nitrogen | residual up to 700 ppm |
| Phosphorus and Sulfur | ≦0.030% by weight |

This composition according to the Schaeffler diagram comprises 8.75 to 14.55% of equivalent nickel and 18.25 to 22.75% of equivalent chromium.

The delta ferrite content contained in the stainless steel varies from 5 to 15% by volume the remainder being austenite.

The delta ferrite content is measured by micrographic counting according to the ASTM E562 standard.

The wire used during the MIG process or the TIG process or the electrodes used for carrying out the deposit of course have the aforesaid chemical composition.

This chemical composition preferably is the following:

| Carbon | 0.030% by weight |
|---|---|
| Manganese | 6.20% by weight |
| Silicon | 0.80% by weight |
| Nickel | 7.90% by weight |
| Chromium | 18.20% by weight |
| Molybdenum | traces |
| Niobium | 0.30% by weight |
| Nitrogen | residual up to 700 ppm |
| Phosphorus and Sulfur | ≦0.030% by weight |

The delta ferrite content for this preferential composition is lying between 6 and 10% by volume. According to the Schaeffler diagram the equivalent nickel is then 11.9% and the equivalent chromium is 19.4%.

Such compositions are providing austeno-ferritic steels which are of particular interest owing to the fact while retaining a good weldability they are generating outstanding properties of mechanical strength and resistance to wear. In other words the austeno-ferritic steel provides an advantageous comprise between the different properties which are: the weldability, the good behaviour under hammer-hardening, the manganese providing the resistance to wear and a good mechanical strength due to the ferrite the islets of which visible at 5 on the microphotography of FIG. 3 are blocking the propagation of cracks.

The carbon steel part 2 having the deposit 1 at its end is subjected to a controlled cooling from about 600° C. down to the room temperature immediately after carrying out the deposition.

The whole carbon steel part 2 together with its end deposit 1 is subjected to a surfacing treatment. The thickness "e" (FIGS. 1 and 2) of the deposit after the surfacing step is lying between 1 and 20 mm and preferably between 1 and 10 mm.

This very small thickness of the deposit is one of the particularly advantageous characterizing features of the invention.

At last the aforesaid assembly 1-2 is welded to the manganese steel part 3 by any suitable welding technique.

According to a preferred embodiment of the method a technique of welding with an electron beam or with a laser beam is used.

These techniques allow to obtain a clearly better operating speed and precision. Furthermore they avoid the formation of a bead which would necessarily appear in the case of a pocket or flash welding.

As seen on FIGS. 1 and 2, the thickness "e" of the deposit 1 made on the carbon steel part 2 after surfacing of the deposit is not altered subsequently by the step of welding of the deposit 1 onto the manganese steel part 3.

Thus the method according to the invention allows to substantially reduce the cost of the performance of the welds by decreasing the consumptions of material and energy, to avoid the formation of beads and their subsequent and expensive removal and above all to avoid the additional and costly use of a shaped part or insert of austenitic or austeno-ferritic steel since according to the invention a thin deposit of austeno-ferritic steel is directly applied onto the carbon steel part.

The assembly of the parts 2 and 3 connected according to the method of the invention by the deposit 1 exhibits outstanding mechanical characteristics in hardness, elongation, strength and bending.

In this respect has been carried out a bending test as shown on FIG. 4 according to the German DV 820-400 standard. This test has shown that no crack is appeared whereas the residual deformation reached the 18 mm of camber required by the standard. At A has been shown the distance (1 meter) between the supports 4 during the test, at R a ruler representing the horizontal and at B the camber of 18 mm corresponding to the residual deformation of the test piece.

It should be further be pointed out that upon the passage of a rolling load such as a train on the assembly obtained by the method of the invention the risk of sagging is removed in view of the very small thickness of the deposit 1 between the carbon steel part or rail 2 and the manganese steel part or track 3 connected by the said deposit.

The method of the invention is indeed applicable mainly to the connection of carbon steel rails to track parts of manganese steel with 12–14% by weight of manganese.

The assemblies manufactured according to the invention are meeting to a large extent the safety standards applied by the railways abroad as well as in France.

It should be understood that the invention comprises all the means constituting technical equivalents of the means described as well as their combinations if the latter are carried out according to its gist and within the scope of the appendant claims.

What is claimed is:

1. A method of connecting a manganese steel part to a carbon steel part, comprising depositing an austeno-ferritic stainless steel at an end of at least one carbon steel part and welding the end of the carbon steel part with the deposit thereon to the manganese steel part, said austeno-ferritic stainless steel having a composition comprising 0.025-0.035% by weight carbon, 6-11% by weight manganese, 0.5-1.5% by weight silicon, 5-8% by weight nickel, 17.5-20% by weight chromium, 0.25-0.35% by weight niobium, less than 0.5% by weight molybdenum, less than 0.030% by weight phosphorus and sulfur, and residual amounts of nitrogen up to 700 ppm, and the delta ferrite content of said austeno-ferritic stainless steel as measured by counting is from about 5% to about 15% by volume.

2. A method according to claim 1, further comprising preheating the carbon steel part prior to the deposition step to a temperature from about 300° C. to about 600° C.;

carrying out the deposition of the austeno-ferritic stainless steel onto the end of the carbon steel part by means of a wire;

subjecting the carbon steel part having the deposit therein to a controlled cooling immediately after the deposition step; and thereafter welding the carbon steel part to the manganese steel part.

3. A method according to claim 2, wherein the controlled cooling is effected at a temperature from about 600° C. to room temperature.

4. A method according to claim 2, wherein after the controlled cooling step the carbon steel part having the deposit at its end is subjected to a treatment for surfacing this deposit.

5. A method according to claim 2, wherein the wire constitutes the austeno-ferritic stainless steel.

6. A method according to claim 2, wherein the deposition of the austeno-ferritic stainless steel onto the end of the carbon steel part is carried out by a process selected from the group consisting of the MIG process and the TIG process.

7. A method according to claim 1, wherein the carbon steel part is welded to the manganese steel part by a welding technique selected from the group consisting of electron beam welding and laser beam welding.

8. A method according to according to claim 1 wherein prior to the welding step the deposit of austeno-ferritic stainless steel onto the carbon steel part has a thickness between about 1 and 20 millimeters.

9. A method according to claim 8, wherein the thickness of the deposit of austeno-ferritic stainless steel is between about 1 and about 10 millimeters.

10. A method according to claim 1, wherein the austeno-ferritic stainless steel has the following chemical composition:

| | |
|---|---|
| Carbon | 0.030% by weight |
| Manganese | 6.20% by weight |
| Silicon | 0.80% by weight |
| Nickel | 7.90% by weight |
| Chromium | 18.20% by weight |
| Molybdenum | traces |
| Niobium | 0.30% by weight |
| Nitrogen | residual up to 700 ppm |
| Phosphorus and Sulfur | ≦0.030% by weight | and the delta ferrite content of which is between 6 and 10% by volume.

11. A method according to claim 1, wherein the carbon steel part is a railway track rail and the manganese steel part is a track element.

12. A method according to claim 1, further comprising preheating the carbon steel prior to the deposition step to a temperature from about 300° C. to about 600° C.;

carrying out the deposition of the austeno-ferritic stainless steel onto the end of the carbon steel part by means of electrodes;

subjecting the carbon steel part having the deposit thereon to a controlled cooling immediately after the deposition step; and thereafter welding the carbon steel part to the manganese steel part.

13. A method according to claim 12, wherein the controlled cooling is effected at a temperature from about 600° C. to room temperature.

14. A method according to claim 12, further comprising subjecting the carbon steel part to a surfacing treatment for surfacing the deposit after the controlled cooling step.

15. A method according to claim 12, wherein the electrodes constitute the austeno-ferritic stainless steel.

16. An assembly of at least one manganese steel part and one carbon steel part, wherein it is obtained by the method according to claim 1.

* * * * *